United States Patent [19]

Schorr et al.

[11] 4,280,177

[45] Jul. 21, 1981

[54] IMPLICIT ADDRESS STRUCTURE AND METHOD FOR ACCESSING AN ASSOCIATIVE MEMORY DEVICE

[75] Inventors: Herbert Schorr, Briarcliff Manor; Irving Waldawsky-Berger, New York, both of N.Y.

[73] Assignee: International Business Machines Corporation, Armonk, N.Y.

[21] Appl. No.: 53,658

[22] Filed: Jun. 29, 1979

[51] Int. Cl.³ .............................................. G06F 13/00
[52] U.S. Cl. ................................................... 364/200
[58] Field of Search ... 364/200 MS File, 900 MS File; 365/49

[56] References Cited

U.S. PATENT DOCUMENTS

| | | | |
|---|---|---|---|
| 3,764,996 | 10/1973 | Ross | 364/200 |
| 3,800,286 | 3/1974 | Brown et al. | 364/200 |
| 3,825,904 | 7/1974 | Burk et al. | 364/200 |
| 3,840,862 | 10/1974 | Ready | 364/200 |
| 4,070,706 | 1/1978 | Scheuneman | 364/200 |
| 4,084,226 | 4/1978 | Anderson et al. | 364/200 |

*Primary Examiner*—Raulfe B. Zache
*Attorney, Agent, or Firm*—John J. Goodwin

[57] ABSTRACT

An implicit address structure and technique are disclosed for rapidly accessing storage registers by eliminating the need for generating a separate address before referencing the register. A structure is provided for generating an address composed of parameters which are incorporated into the contents of the storage register. At the same time that the address generation occurs, the structure of the present invention provides an associative compare of the implicit registers, and if there is a match, the address generation step is terminated and the data is immediately available from the implicit register.

5 Claims, 13 Drawing Figures

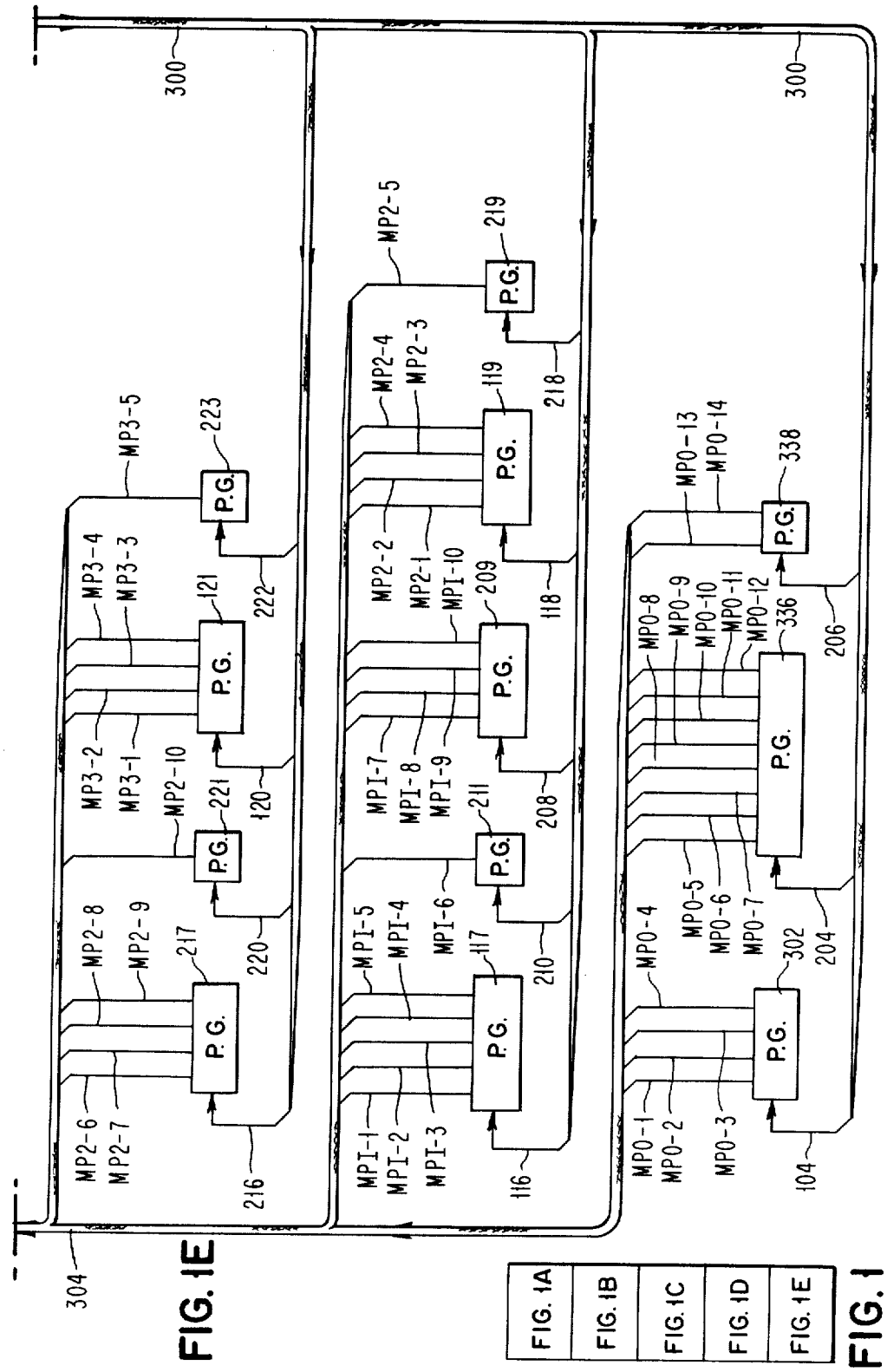

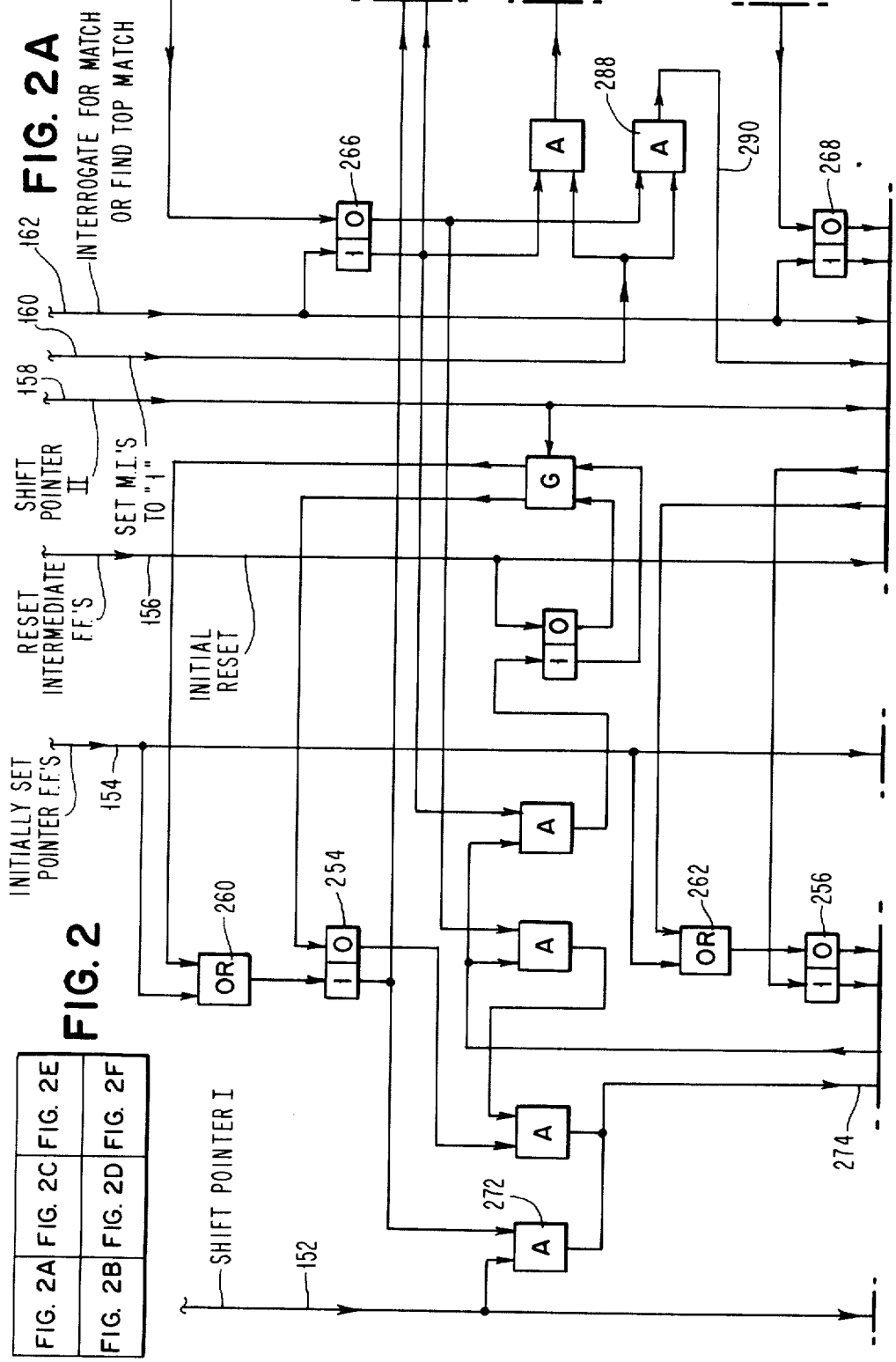

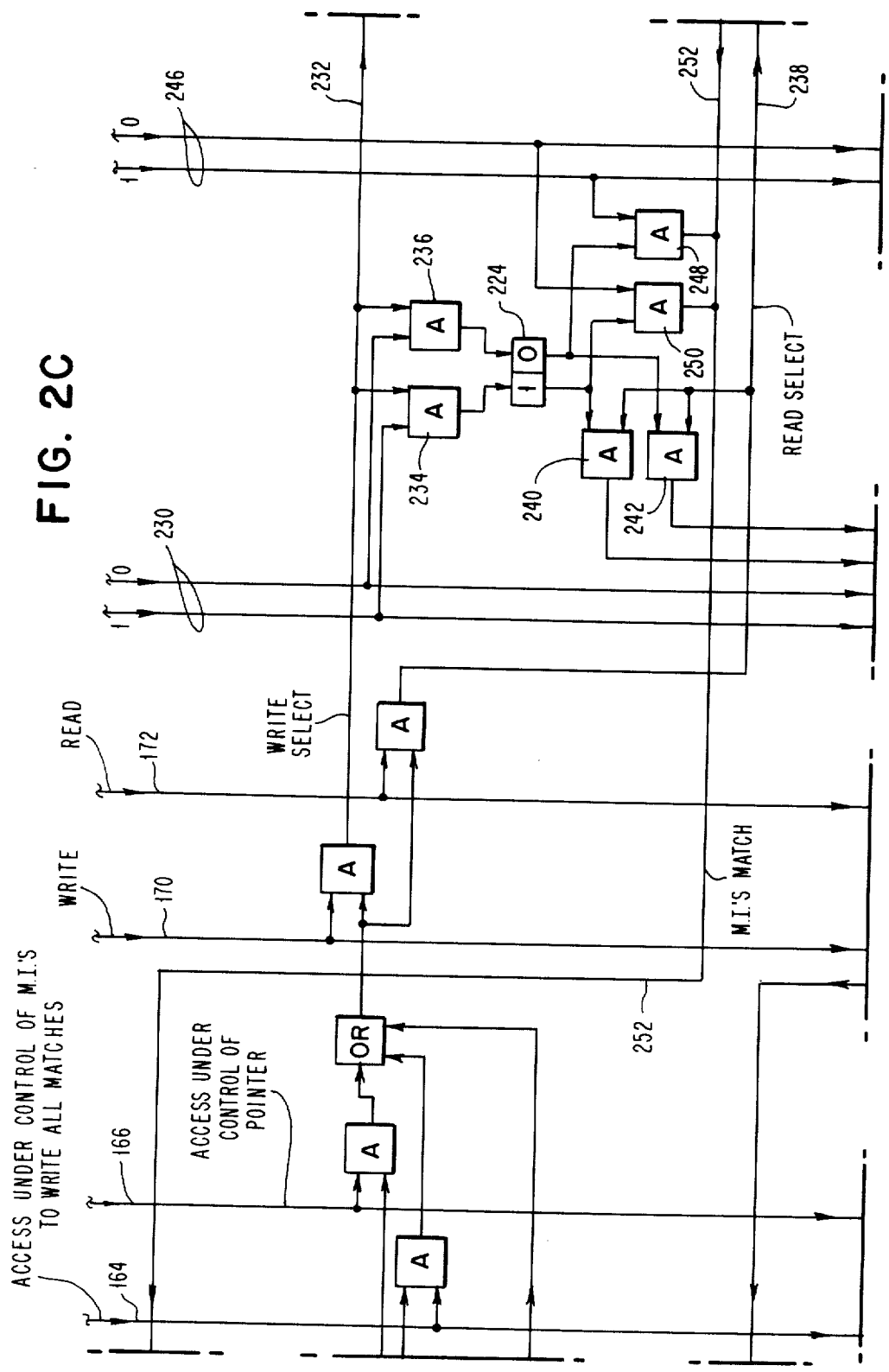

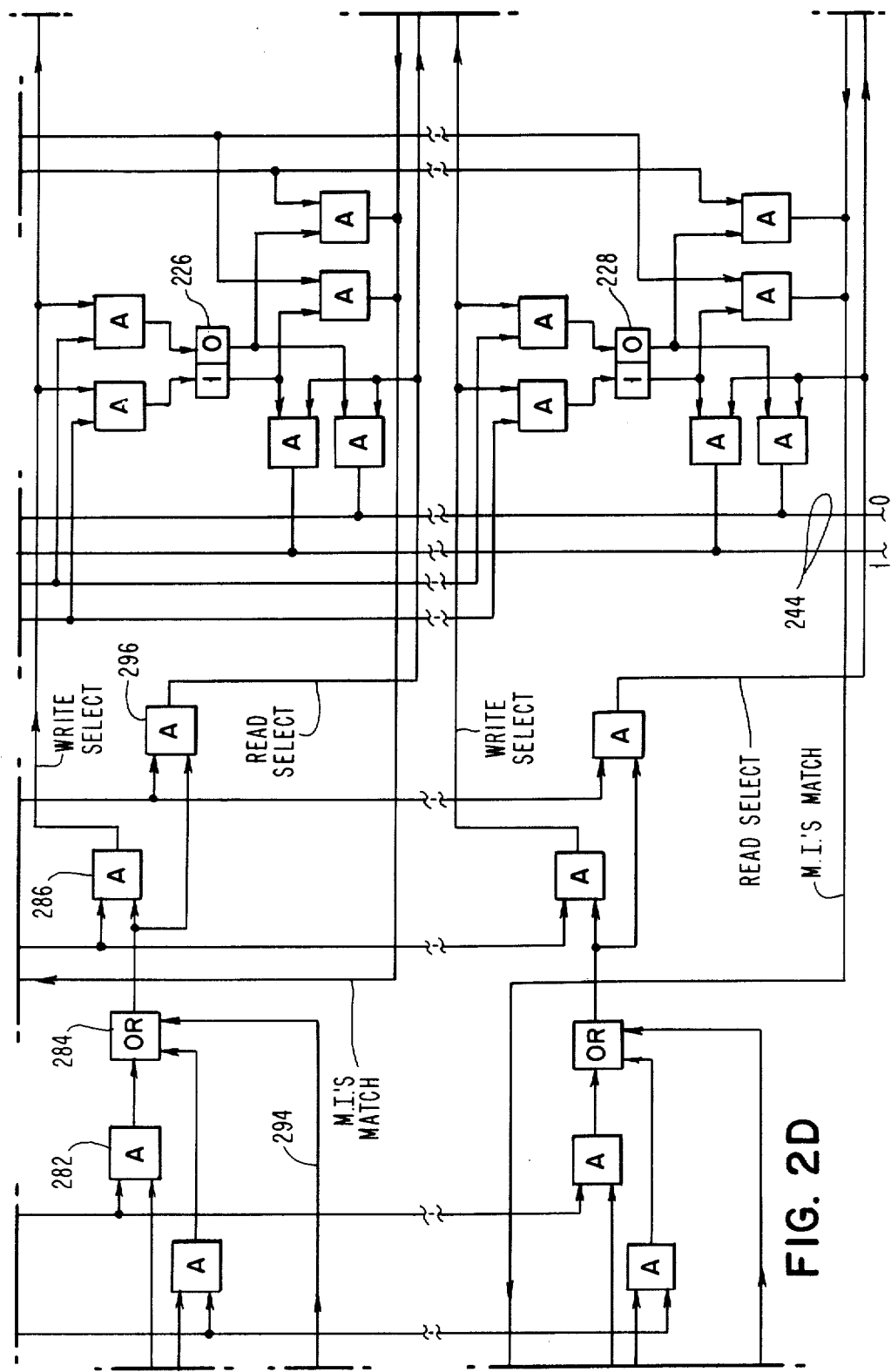

IMPLICIT ADDRESS STRUCTURE AND METHOD FOR ACCESSING AN ASSOCIATIVE MEMORY DEVICE

DESCRIPTION

1. Technical Field

The present invention relates to memory device addressing and accessing and more particularly to a structure and method whereby a memory device, for example a cache, may be accessed without parameters. For example, in a machine with a base register B and a displacement D, the contents of B and D would go into forming the name of the register currently containing the data stored in that memory location.

2. Background Art

The prior art discloses a wide variety of structures and methods for address generation.

U.S. Pat. No. 3,825,904 issued July 23, 1974 to Burk et al and entitled "Vertical Memory System" discloses a table-look-up technique wherein virtual to real address translation, once determined, are stored in a directory look-aside table in anticipation of future use.

U.S. Pat. No. 3,764,996 issued Oct. 9, 1973 to Ross and entitled "Storage Control and Address Translation" discloses a virtual memory system comprising a main storage and a small high speed buffer. Current virtual-to-real address translations for both the main storage and the buffer are retained in a storage control and address translator (SCHE). The SCHE comprises a content addressable (associative) memory. The CPU provided virtual address is used to interrogate the SCAT. If the data that is referenced by the virtual addresses available in main storage, the SCAT provides the main storage real address. If the data is also available in the buffer, the SCAT provides the buffer real address.

U.S. Pat. No. 3,800,286 issued Mar. 26, 1974 to Brown et al and entitled "Address Development Technique Utilizing a Content Addressable Memory" discloses a technique for developing an actual address from a relative address using a content addressable memory.

The referenced prior art discloses different techniques for address generation. None of the art of record, however, discloses the concept of accessing a memory device without an initial address generation step as taught by the present invention.

BRIEF DESCRIPTION OF THE DRAWINGS

FIGS. 1A, 1B, 1C, 1D and 1E arranged as illustrated in FIG. 1 show a detailed schematic diagram an embodiment of an implicit register addressing structure according to the principles of the present invention.

FIGS. 2A, 2B, 2C, 2D, 2E and 2F arranged as shown in FIG. 2 illustrate specific circuit details of an associative memory means shown in FIG. 1B.

DISCLOSURE OF THE INVENTION

Figure 1A:
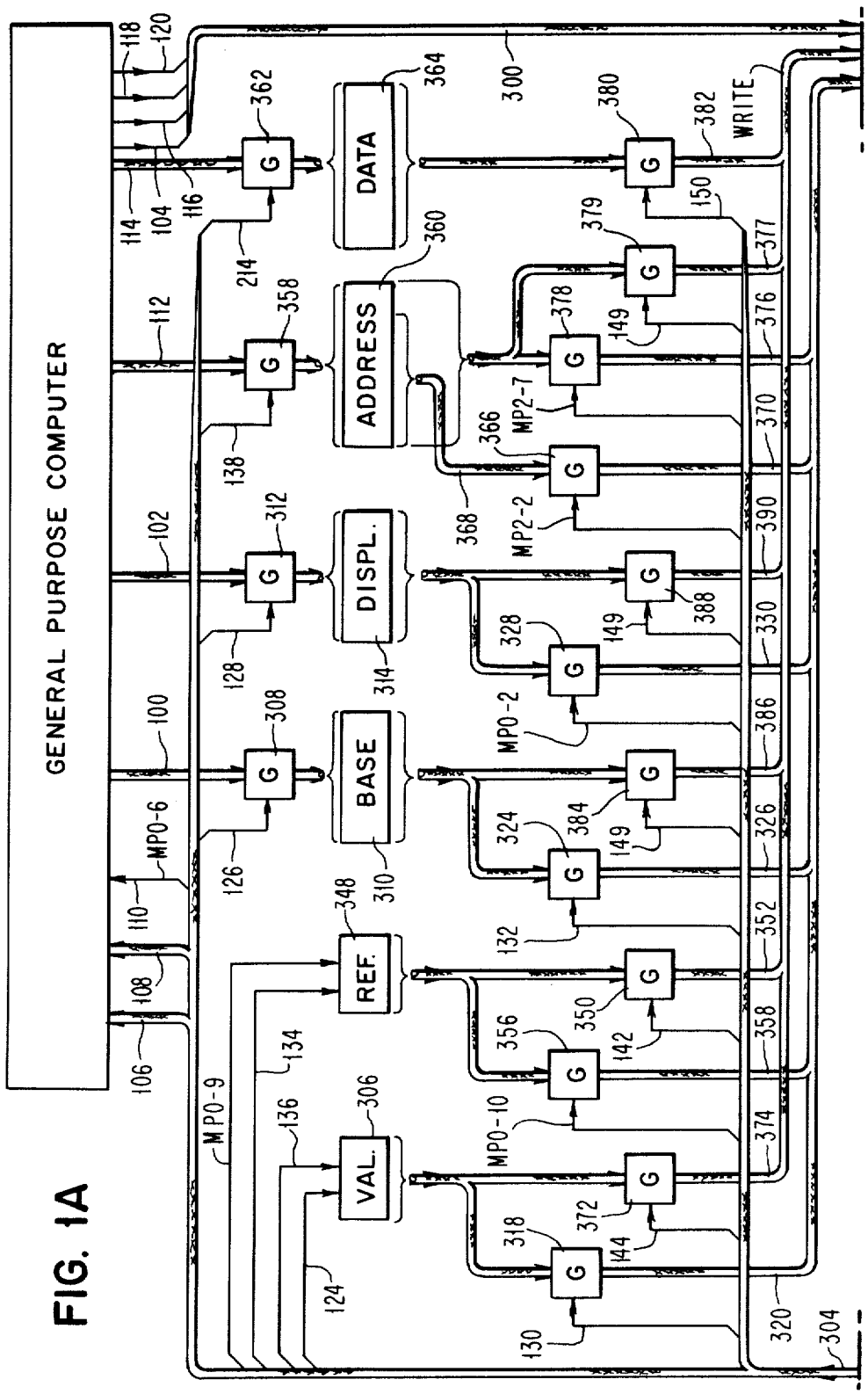

Normally, existing computer systems include a fixed number of general registers. These are used as base registers to relocate addresses, as index registers to modify addresses during an iteration, and as the recipients of operands for executing arithmetic or logical operations. Usually registers are implemented out of the fastest possible technology and are packaged in close proximity to the address generation logic and to the arithmetic and logic unit (ALU) of the compiler, so they constitute the only place to store information when logic-speed access to the information is desired.

One way of increasing the speed of such computers is to increase the number of such registers provided. This is often impossible to do by providing additional explicit registers unless the whole machine structure is changed, because the instruction does not provide for any additional bits for referencing the extra registers. For example, if four bits are provided for explicit register referencing in the instruction format, it is impossible to explicitly address more than sixteen registers.

Another way of increasing the number of registers in a computer is by implicitly naming the register, that is, by temporarily associating some memory location with the register, which is then effectively named by the specific memory location. Thus, an associated location must be provided with each register to store its present "name" or associated memory location as well as a mechanism to quickly compare a referenced memory location with those currently associated with registers. This has been done in the prior art, using the address of the memory location as the register name. The difficulty with this approach is that address generation must precede the register compare step for any reference, thus slowly down the access to the information contained in the register by the time it takes to generate the address.

In the present invention, a structure is provided which speeds up the access to the registers by eliminating the need for generating an address before referencing the register. The structure provided embodies the inventive concept of using the parameters that go into computing the address as the "name" of the register, rather than the address itself. For example, in a computer with a base register B and a displacement D, the contents of B and D would go into forming the name of the register currently containing the data stored in that memory location.

At the same time that address generation occurs, the structure of the present invention provides an associative compare of the implicit registers, and if there is a match, the address generation step is terminated and the data is immediately available from the implicit register. Whenever a register is changed, all those implicit registers that used the changed register as part of their name must be invalidated.

In a computer system structure where more registers form part of the address computation, such as a base B, an index X and a displacement D, the present invention provides the choice of ignoring X and only using B implicit register when X is not present, or the above scheme can be generalized with contents of B, X and now forming the register name.

There are a number of ways of implementing the principles of the present invention for very fast register access. For example, the total number of implicit registers can be split into associative classes based on B or the pair B and X. In the latter case, only the D field need be compared to obtain a match. The split by associative classes based on B or X change.

Before describing the operation of the complete system shown in FIGS. 1A, 1B, 1C, 1D and 1E, a description of the operation of the associative memory circuits used and shown in FIG. 1B will be described in detail. The associative memory circuits employed are available in the prior art as described in U.S. Pat. No. 3,317,898 entitled, "Memory System," and issued May 2, 1967 to H. Hellerman, and U.S. Pat. No. 3,541,529 entitled, "Replacement System," and issued Nov. 17, 1970 to R. A. Nelson, both of which are assigned to the IBM Corporation. The memory circuits are shown and described in the aforesaid U.S. Pat. No. 3,317,898 and the replacement technique is shown and described in aforesaid U.S. Pat. No. 3,547,529.

Figure 1B:
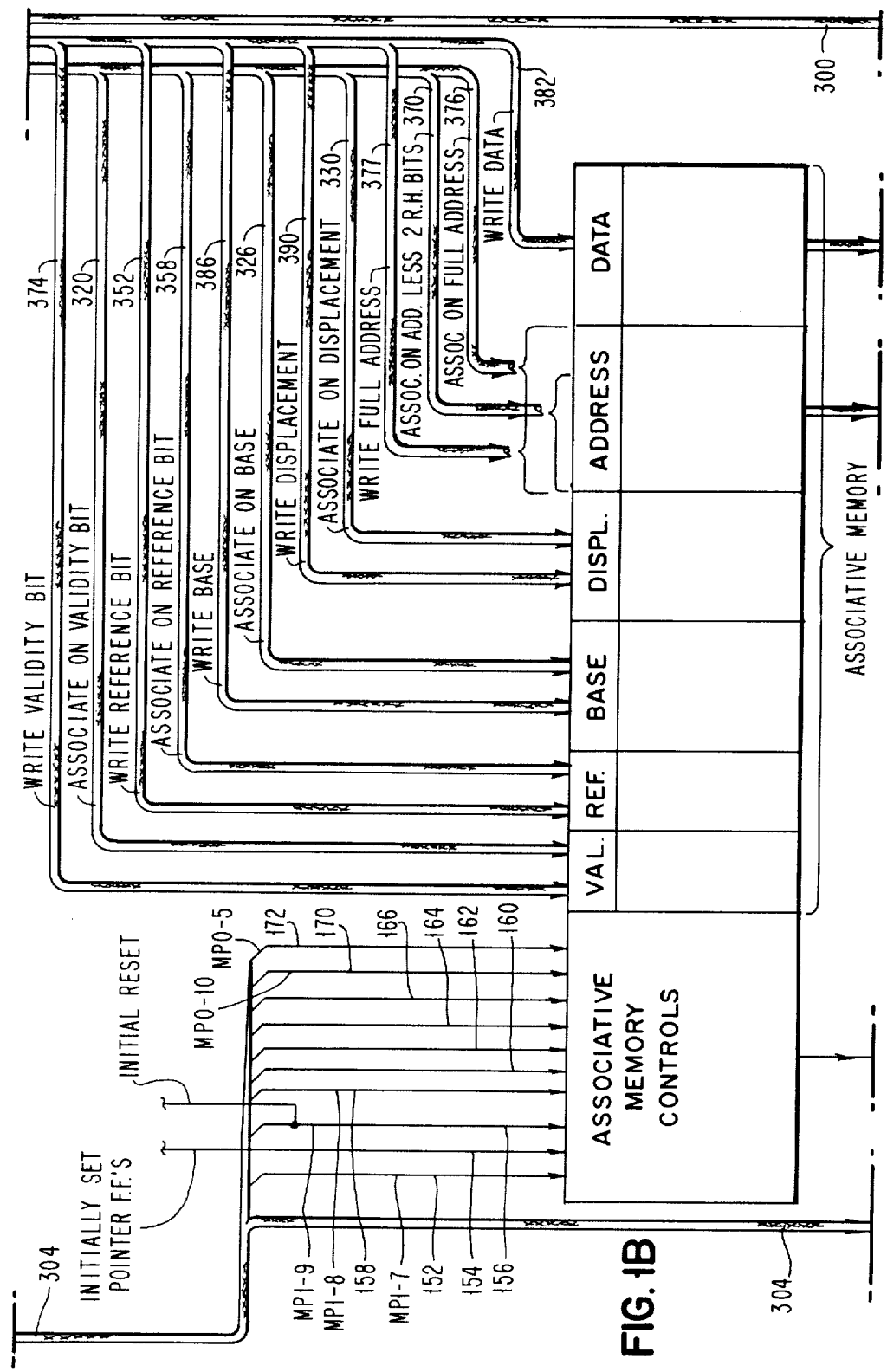
Figure 1C:
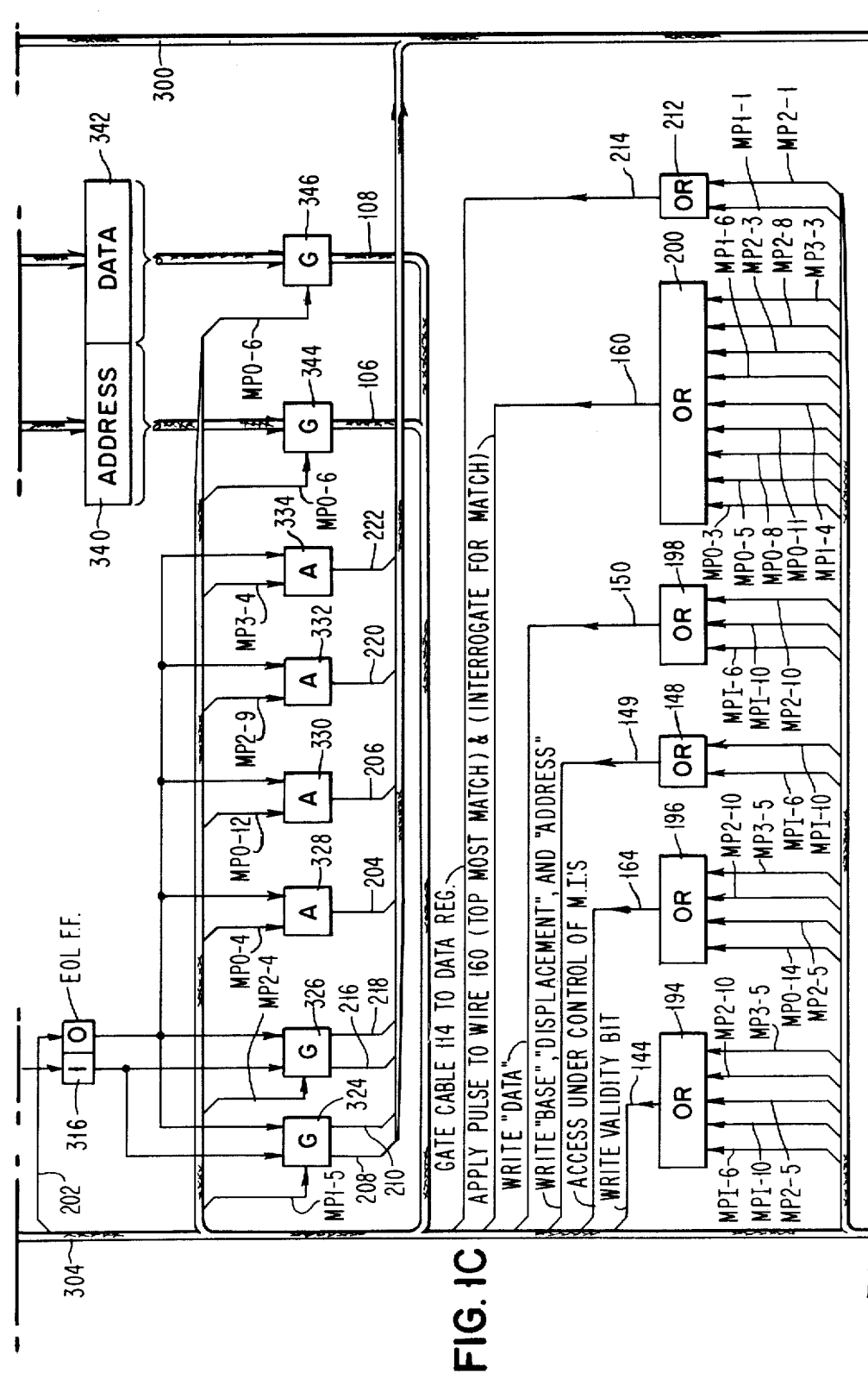
Figure 1D:
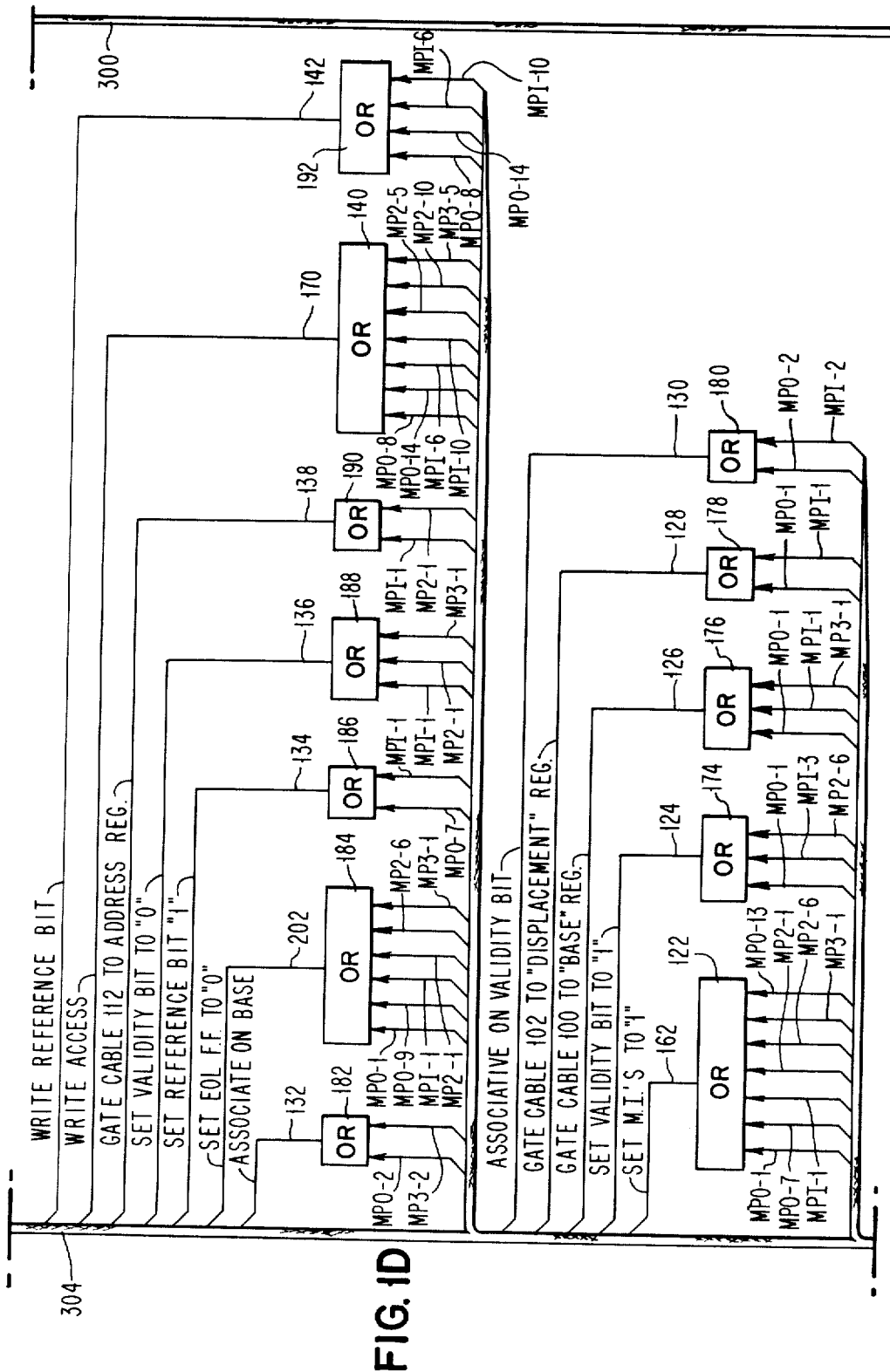
Figure 2B:
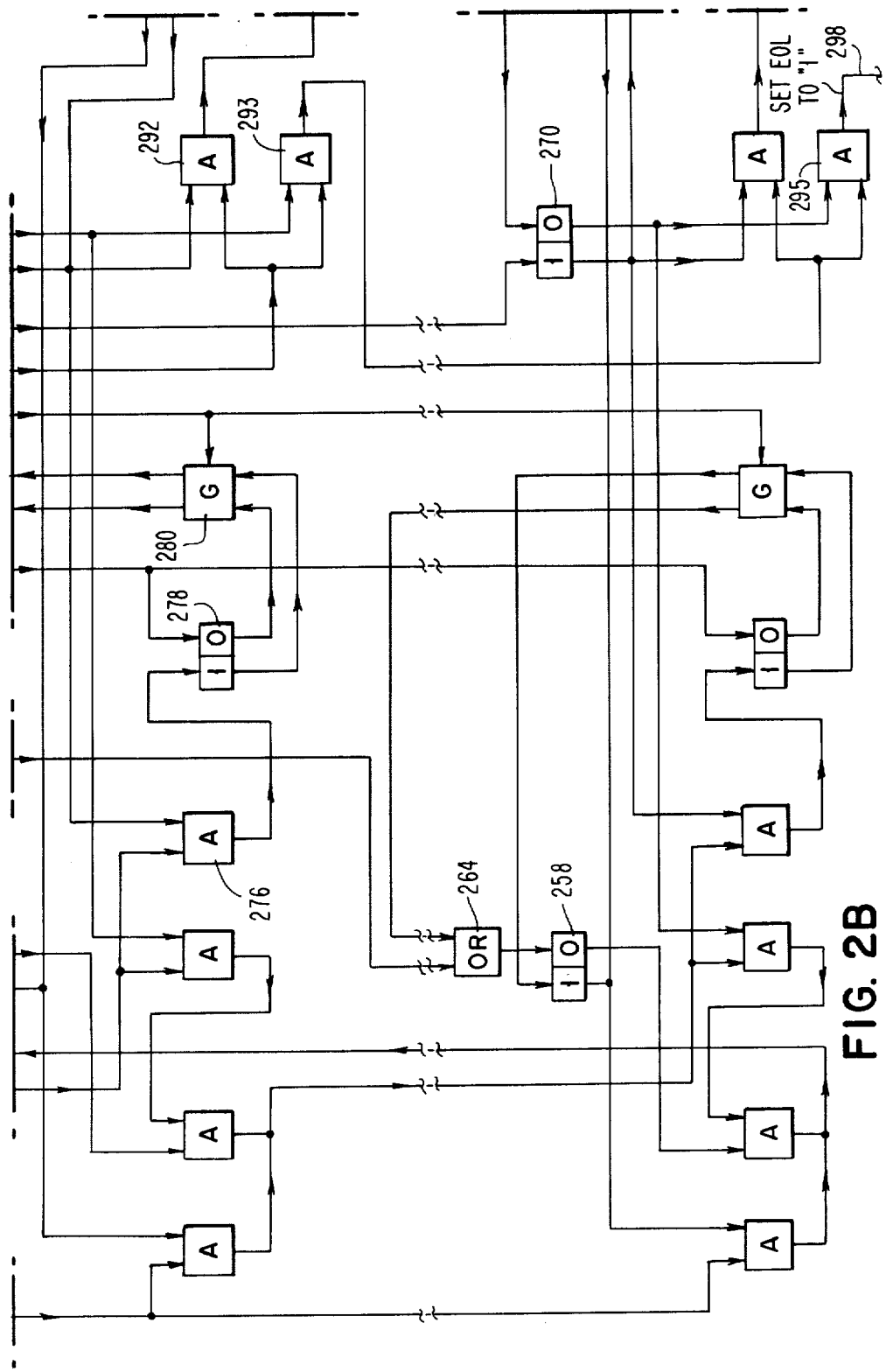
Figure 2E:
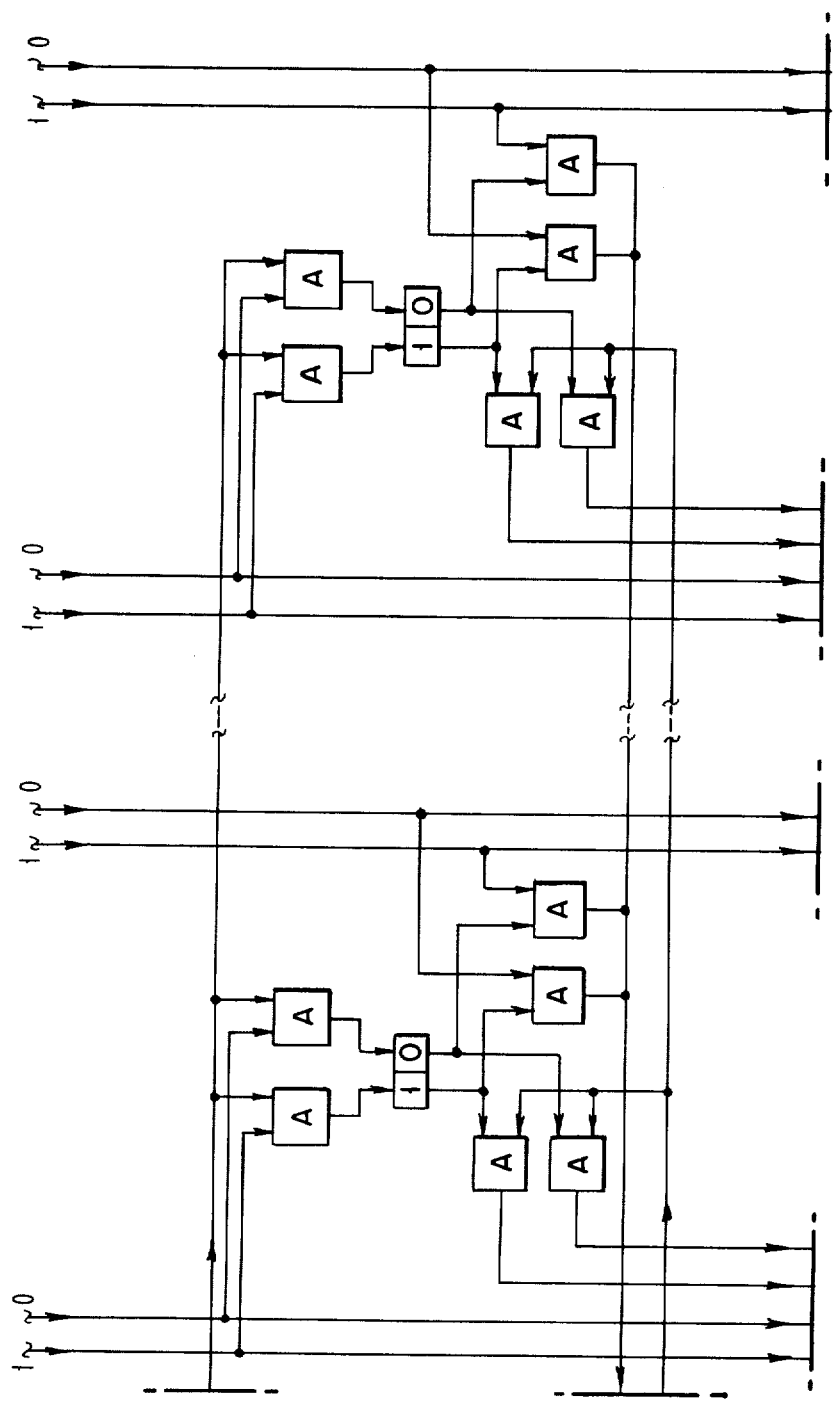
Figure 2F:
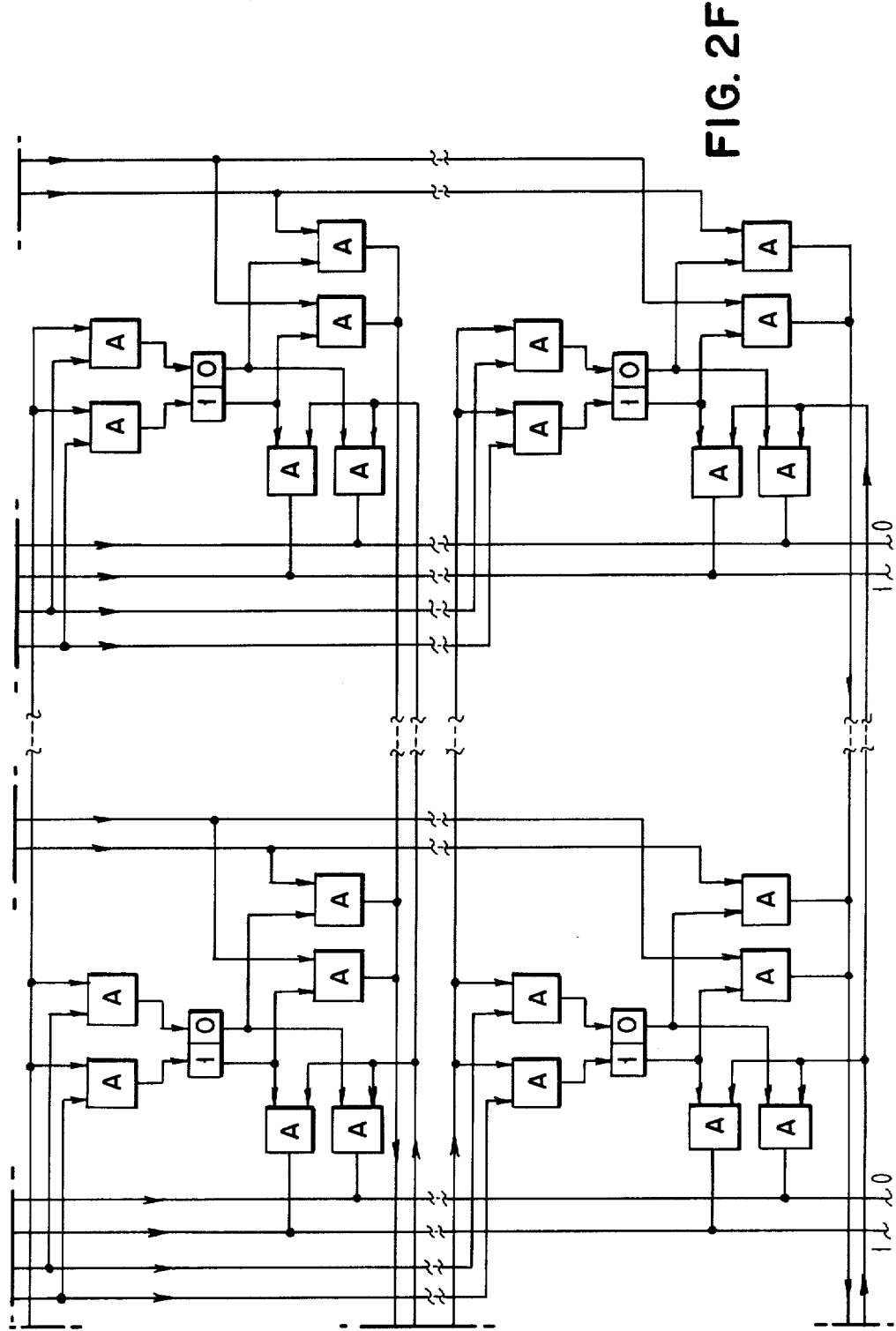

A detailed embodiment of the present invention for implicit register usage will be described with reference to FIGS. 1A, 1B, 1C, 1D and 1E arranged as shown in FIG. 1 which provide a complete wiring diagram of one embodiment of the invention, and with reference to FIGS. 2A through 2F arranged as illustrated in FIG. 2 which show detailed diagrams of the associative memory shown in FIG. 1B.

The associative memory circuits used in the described embodiment are taken from U.S. Pat. No. 3,541,529 to R. A. Nelson. This patent may be referred to for a detailed description of the circuitry. Most of the associative memory circuits are shown in the Hellerman Patent, U.S. Pat. No. 3,317,898, but the replacement algorithm is only shown in U.S. Pat. No. 3,541,529 to R. A. Nelson. A brief description of the associative memory circuit will be given in this embodiment with reference to FIGS. 2A through 2F as follows.

More particularly, referring to FIGS. 2C, 2D, 2E and 2F, a 3×3 associative memory is shown but it is obvious how this can be expanded to any size desired as indicated by the broken lines. Referring to FIGS. 2C and 2D, the storage elements in the left-hand column of the associative memory are shown by flip-flops such as 224, 226 and 228. These flip-flops can be written into, read out of, or associated upon, as will be explained. To write into flip-flop 224, information is put on one of the leads of pair 230. By this is meant that either the line marked "1" is active or the line marked "0" is active. The "write select" lead 232 is also made active which connects to the AND circuits 234 and 236. In this manner, flip-flop 224 is set to either its "1" or "0" state.

To read out of flip-flop 224, lead 238 is made active. This active state of lead 238 extends to AND circuits 240 and 242 so that the information in flip-flop 224 will appear on one of the leads of pair 244. Thus, one of the leads in pair 244 will be active.

To associate on the information in flip-flop 224, information is placed on leads 246 which extend to AND circuits 250 and 248. An examination of the circuit will show that if a mismatch occurs, a signal will appear on lead 252. If there is a match, no signal will appear on lead 252.

Reference should next be made to FIG. 2A. The flip-flops 254, 256 and 258 are the "pointer" flip-flops associated with the replacement technique. Before the computer is put in operation, an initial pulse is applied to lead 154 at the top of FIG. 2A, which extends through OR circuit 260 to set flip-flop 254 to its "1" state and through OR circuit 262 to set flip-flop 256 to its "0" state and through OR circuit 264 to set flip-flop 258 to its "0" state. In this manner, the initial setting of the pointer flip-flops 254, 256 and 258 sets the top most flip-flop to "1" and all the others to "0". Flip-flops 266, 268 and 270 are the match indicators. Before performing an association function, these flip-flops 266, 268 and 270 are all set to "1" by applying a pulse to lead 162. In any word where there is a match, the related flip-flop (match indicator) is left in its "1" state. Any word where there is a mismatch, the related match indicator is set to its "0" state by the associative circuits just described in connection with FIGS. 2C, 2D, 2E and 2F.

The replacement technique depends both on the pointer flip-flops such as 254, 256 and 258, and also the match indicator flip-flops 266, 268 and 270.

As will be understood later on in this description or in the teachings of aforesaid U.S. Pat. No. 3,541,529, each word in the associative memory has a "reference" bit which is set to "1" every time it is referenced. These reference bits are monitored each time a word is read from the associative memory and, each time a word is read from the associative memory, its reference bit is set to "1". An additional check is made to see if all reference bits are set to "1". If they are all set to "1", they are all reset to "0" as will be explained later or can be understood by the teaching of U.S. Pat. No. 3,541,529.

To briefly explain the operation of the replacement technique, it is assumed that on FIG. 2A the pointer flip-flop 254 is in its "1" state. Let it also be assumed that, as a result of an association on the reference bit, the match indicator flip-flop 268, also on FIG. 2A, is in its "1" state. The action of the replacement technique is then as follows.

A pulse is applied to the "shift pointer 1" lead 152 on FIG. 2A. This pulse extends through AND circuit 272 because flip-flop 254 is in its "1" state. AND circuit 272 will have an output on lead 274 which extends to AND circuit 276. The other input to AND circuit 276 is from the "1" side of the latch indicator flip-flop 268 which is in its 268 "1" state. Therefore flip-flop 278 which is called one of the "intermediate" flip-flops is set to its "1" state. A pulse is then applied to lead 158 which extends to gate 280 in order to transfer the information in flip-flop 278 to flip-flop 256. In other words, flip-flop 256 is set to its "1" state. It is now possible to write a word into the associative memory under the control of the pointer flip-flop 256 by applying a pulse to lead 166 and lead 170.

This will result in a pulse through AND circuit 282, through OR circuit 284, through AND circuit 286, to the write select line for the second from the top word in the associative memory. In the manner just described, the pointer can be moved from its existing position to the next position in the associative memory where the reference bit is equal to zero and, in that position, data can be written in the associative memory. After the pulse is applied to lead 158 which is the "shift pointer 2" line, a reset pulse must be applied to lead 156 in order to reset any intermediate flip-flops such as 278 which might have been set to 1.

The match indicators such as flip-flops 266, 268 or 270 on FIGS. 2A and 2B are interrogated by a pulse on lead 160. The pulse on lead 160 is used for two different purposes. If any of the match indicators are set to "1", the pulse on lead 160 will find the topmost match and provide a circuit so that this topmost match can be either written into or read out of. For example, suppose it is desired to find a top most match in the associative memory and this top most match is in the second position which would mean that match indicator 268 on FIG. 2A would be in its "1" position. Match indicator 266 directly above it would be in this "0" position. Therefore, if a pulse is applied to lead 160 it will find a path through AND circuit 288, lead 290, AND circuit 292, lead 294, OR circuit 284 and then via either AND circuit 286 to the write select lead or via and circuit 296 to the read select lead. The write or read leads are selected by pulses placed on either lead 170 or lead 172. The second use of the pulse on lead 160 is to test the match indicators to see if there is a match after an associative operation.

For example, if all the match indicators such as 266, 268 and 270 are in their "0" states, a pulse applied to lead 160 will pass through AND circuit 288, AND circuit 293 (FIG. 2B) and through the lower AND circuit 295 and exit on lead 298 at the bottom of FIG. 2A. A pulse on 298 will set the EOL flip-flop to its "1" state which will be explained in more detail later.

Having discussed the operation of the associative memory circuits, the operation of the complete structure of the present invention will now be described with reference to FIGS. 1A, 1B, 1C and 1E. In FIG. 1A, the general purpose computer communicates with the implicit registers as follows:

The operation of the system of the present invention begins with a requirement from the general purpose computer in the form of an instruction which requires an address generation in order to obtain data or to place data in storage. However, before completing the time consuming operation of the address generation, the structure of the present invention uses the "base" and "displacement" information which are contained in the instruction from the general purpose computer. The "base" and "displacement" are applied to the implicit registers of the associative memory (via cables 100 and 102 of FIG. 1A) and provides a signal (via lead 104 of FIG. 1A) which starts a microprogram to obtain the address and the data if they exist in one of the implicit registers.

If there is an entry in one of the implicit registers which corresponds to the "base" and "displacement", that one implicit register sends the address and data contained therein back to the general purpose computer along with a "data valid" signal. This "data valid" signal, when received by the general purpose computer, aborts its own (computer's) address generation and accepts the address and data from the implicit register with a resulting saving in time.

Any number of implicit registers may be employed in the present invention depending on the amount of addresses and data that it is desired to be stored.

In the event that the general purpose computer provides an instruction for which no implicit register was provided, for example, a rarely used instruction, then there will be no implicit register entry on the base and displacement of the instruction and no corresponding association. The result will be that no "data valid" signal is produced and the general purpose computer proceeds with its own address generation and the obtaining of the data from the usual data storage or cache. The general purpose computer leaves the "base" on cable 100 (FIG. 1A) the "displacement" on cable 102 and puts the address on cable 112 and the data on cable 114 (FIG. 1A).

The general purpose computer then provides a signal on one of two leads depending on whether it is executing a "store" (wherein that data must be stored at the given address) or a "non-store" instruction. If the computer is executing a "non-store" instruction, the computer puts a signal on lead 116 (FIG. 1A) which calls for a "Type I" access (a MP1 sequence to be later discussed) of the implicit registers. If the computer is executing a "store" instruction, it puts a signal on lead 118 which calls for "Type II" access (an MP2 sequence to be later discussed) of the implicit registers.

If the general computer execution and instruction (referred to and later described as the MP3 sequence) which changes the contents of a general purpose register in the system, the address of the general purpose register will be put on cable 100 (FIG. 1A) and a signal is placed on lead 120 (FIG. 1A) which instructs the related implicit register to perform a "Type III" update (referred to and discussed later as an MP3 sequence).

The four different updates, or the implicit registers, (to be later explained in detail) are the MP0, the MP1, the MP2 and the MP3 sequences. The first (MP0) sequence is initiated by a signal on lead 104 (FIG. 1A). The second (MP1) sequence is initiated by a signal on lead 116 (FIG. 1A). The third (MP2) sequence is initiated by a signal on lead 118 (FIG. 1A) and the fourth (MP3) sequence is initiated by a signal on lead 120 (FIG. 1A).

More particularly, referring to FIGS. 1A through 1E, if the general purpose computer has an instruction which requires an address generation in order to get data or store data, the general purpose computer puts the "base" B on cable 100, the "displacement" D on cable 102 and also provides a signal on lead 104 of cable 300. Lead 104 extends via cable 300 to FIG. 1E and a pulse thereon is effective to start the pulse generator 302 which delivers four pulses in succession, MP0-1 through MP0-4. The first pulse, MP0-1, extends via cable 304 to FIG. 1D where it passes through OR circuit 174 to lead 124. Lead 124 extends via cable 304 to FIG. 1A where it is effective to set the "validity" bit in register 306 to its "1" state. In FIG. 1D, the MP0-1 pulse also extends through OR circuit 176 to lead 126 which extends via cable 304 to FIG. 1A and is applied to gate 308 in order to gate the information on cable 100 to the "base" register 310. In FIG. 1D, the MP0-1 pulse also extends through OR circuit 178 to lead 128 which extends via cable 304 to FIG. 1A and the pulse thereon is applied to gate 312 in order to gate the information on cable 102 to the "displacement" register 314.

In FIG. 1D, the MP0-1 pulse also extends through OR circuit 122 to lead 162 which extends via cable 304 to FIG. 1B and the pulse thereon is used to set the match indicator flip-flops in the associative memory controls to their "1" state. In FIG. 1D, the MP0-1 pulse also extends through OR circuit 184 to lead 202 which extends via cable 304 to FIG. 1C and the pulse on lead 202 is used to set EOL flip-flop 316 to its "0" state. This is the end of the MP0-1 pulse. The next pulse to be described will be the MP0-2 pulse.

In FIG. 1D, the MP0-2 pulse extends through OR circuit 180 to lead 130 which extends via cable 304 to FIG. 1A where the pulse thereon is applied to gate 318 in order to gate the "validity" bit to cable 320 which extends to the "validity" section of the associative register in FIG. 1B. In FIG. 1D, the MP0-2 pulse also extends through OR circuit 182 to lead 132 which extends via cable 304 to FIG. 1A where the pulse thereon is applied to gate 324 in order to gate the "base" to cable 326 which extends to the "base" section of the associative register in FIG. 1B. The MP0-2 pulse also extends via cable 304 to FIG. 1A where it is applied to gate 328 in order to gate the "displacement" to cable 330. Cable 330 extends to the "displacement" section of the associative register of FIG. 1B.

Next, the MP0-3 pulse from pulse generator 302 of FIG. 1E extends through cable 304 to OR circuit 200 of FIG. 1C and then to lead 160 which extends via cable 304 to FIG. 1B in order to interrogate the associative memory controls to the associative memory for a match. If, as a result of the pulse on lead 160, flip-flop 316 on FIG. 1B is set to its "1" state, it indicates that there is no match in the associative memory.

It is next necessary to test the "end of line" (EOL) flip-flop 316 of FIG. 1B, which is done by the MP0-4 pulse. The MP0-4 pulse from pulse generator 302 extends via cable 304 to FIG. 1C where it is applied to AND circuit 328. The other input to this AND circuit is the "0" side of EOL flip-flop 316. If flip-flop 316 is in its "0" state, a pulse will appear on lead 204 which extends via cable 300 to FIG. 1E and is used to start the pulse generator 336 which produces the pulse sequence MP0-5 through MP0-12.

The MP0-5 pulse from pulse generator 336 extends via cable 304 to FIG. 1B where it is applied to lead 172 in order to provide the read access for the associative memory. The MP0-5 pulse also extends via cable 304 to FIG. 1C where it passes through OR circuit 200 to lead 160 which extends to FIG. 1B and the pulse thereon is used to locate the topmost match in the associative memory and read it out. In this manner, the address and the data contained in the topmost word that matched in the associative memory in FIG. 1B will be read out and entered into registers 340 and 342 of FIG. 1C.

The MP0-6 pulse from pulse generator 336 extends on cable 304 to FIG. 1C where it is applied to gate 344 in order to gate the "address" from register 340 to cable 106. The cable 106 extends via cable 304 to FIG. 1A where it is applied to the general purpose computer. The MP0-6 pulse from pulse generator 336 also extends to FIG. 1C where it is applied to gate 346 in order to gate the data from register 342 to cable 108. Cable 108 extends via cable 304 to FIG. 1A where it is applied to the general purpose computer. The MP0-6 pulse from pulse generator 336 also extends via cable 304 to FIG. 1A where it is applied to lead 110 in order to provide the "data valid" signal from register 342 to the general purpose computer.

The MP0-7 pulse from pulse generator 336 extends to FIG. 1D where it passes through OR circuit 186 to lead 134. Lead 134 extends to FIG. 1A where the pulse thereon is used to set the reference bit, which is in register 348, to its "1" state.

The MP0-8 pulse from pulse generator 336 extends to FIG. 1D where it is applied to OR circuit 140 to put a pulse on lead 170. Lead 170 extends to FIG. 1B where the pulse thereon provides the write access for the associative memory.

The MP0-8 pulse also extends to FIG. 1D where it passes through OR circuit 192 to lead 142. Lead 142 extends to FIG. 1A where the pulse thereon is applied to gate 350 in order to gate the reference bit to cable 352 which extends to the reference section of the associative memory of FIG. 1B to write the reference bit. The MP0-8 pulse also extends to FIG. 1C where it passes through OR circuit 200 to lead 160 which extends to FIG. 1B and where the pulse thereon provides an access to the associative memory under the control of the topmost match.

The MP0-9 pulse from pulse generator 336 extends to FIG. 1D where it passes through OR circuit 122 to lead 162 which extends to FIG. 1B and where the pulse thereon is used to set all the match indicators to the "1" state. The MP0-9 pulse also extends to FIG. 1A where it is used to set the reference bit which is contained in register 348 to its "0" state. The MP0-9 pulse also extends to FIG. 1D where it passes through OR circuit 184 to lead 202 which extends to FIG. 1C in order to set the EOL flip-flop 316 to its "0" state.

The MP0-10 pulse from pulse generator 336 extends to FIG. 1A where it is applied to gate 356 in order to gate the reference bit from register 356 to cable 358 which extends to FIG. 1B in order to associate on the reference bit.

The MP0-11 and MP0-12 pulses from pulse generator 336 operate as follows. The MP0-11 pulse extends to FIG. 1C where it passes through OR circuit 200 to lead 160 which extends to FIG. 1B and where a pulse thereon is used to interrogate the associative memory for a possible match.

The MP0-12 pulse extends to FIG. 1C where it is applied to AND circuit 330 in order to test EOL flip-flop 316. If flip-flop 316 is in its "0" state, a pulse will appear on lead 206 which extends via cable 300 to FIG. 1E where it is effective to turn on the pulse generator 338 via lead 206 in order to produce the MP0-13 and MP0-14 pulses.

The MP0-13 pulse from pulse generator 338 extends to FIG. 1D via cable 304 where it passes through OR circuit 140 to lead 170 which extends to the associative memory in FIG. 1B and where the pulse thereon is used to provide a write access of the associative memory. The MP0-13 pulse also extends to FIG. 1D where it passes through OR circuit 192 to lead 142 which extends to FIG. 1A where the pulse thereon is applied to gate 350 in order to gate the reference bit from register 348 to cable 352 which extends to FIG. 1B and provides the information in order to write the reference bit. The MP0-13 pulse also extends to FIG. 1C where it passes through OR circuit 196 to lead 164 which extends to FIG. 1B and where a pulse on it is used to access the associative memory under control of the match indicators. Finally, a MP0-14 pulse is produced by pulse generator 338 of FIG. 1E which extends via cable 304 through OR circuit 122 of FIG. 1D to lead 162 which extends via cable 304 to FIG. 1B and the pulse thereon is used to set the match indicator flip-flops in the associative memory controls to their "1" state. This completes the description of the MP0 circuits and a description of the MP1 circuits follow.

In FIG. 1A, the MP1 process is started by a pulse on lead 116 which comes from the general purpose computer. This pulse extends to FIG. 1E via cable 300 where lead 116 is connected to a pulse generator 117 to produce a succession of pulses MP1-1 through MP1-5. The MP1-1 pulse extends to FIG. 1D via cable 304 where it passes through OR circuit 188 to lead 136. Lead 136 extends via cable 304 to FIG. 1A where the pulse thereon is used to set the validity bit, which is in register 306, to its "0" state. In FIG. 1D, the MP1-1 pulse also passes through OR circuit 186 to lead 134 which extends to FIG. 1A and the pulse thereon is used to set the reference bit in register 348 to "1". In FIG. 1D, the MP1-1 pulse also passes through OR circuit 176 to lead 126 which extends via cable 304 to FIG. 1A where the pulse thereon is applied to gate 308 in order to gate cable 100 to the base register 310. In FIG. 1D, the MP1-1 pulse also extends through OR circuit 178 to lead 128 which extends to FIG. 1A and the pulse thereon is applied to gate 312 in order to gate cable 102 to the displacement register 314. In FIG. 1D the MP1-1 pulse also extends through OR circuit 190 to lead 138 which extends to FIG. 1A and the pulse thereon is applied to gate 358 in order to gate cable 112 to the address register 360. In FIG. 1C, the MP1-1 pulse from cable 304 also extends through OR circuit 212 to lead 214 which extends to FIG. 1A where the pulse thereon is applied to gate 362 in order to gate cable 114 to the data register 364. In FIG. 1D, the MP1-1 pulse extends through OR circuit 122 to lead 162 which extends to FIG. 1B and where the pulse thereon is used to set the match indicators in the associative memory to their "1" state. In FIG. 1D, the MP1-1 pulse extends through OR circuit 184 to lead 202 which extends to FIG. 1B and where the pulse thereon is used to set EOL flip-flop 316 to its "0" state.

The MP1-2 pulse from pulse generator 117 of FIG. 1E extends through cable 304 OR circuit 180 of FIG. 1D to lead 130 which extends via cable 304 to FIG. 1A and where the pulse thereon is applied to gate 318 in order to gate the validity bit from register 306 to cable 320 which extends to FIG. 1B and where the validity bit is applied to the associative memory.

The MP1-3 pulse from pulse generator 117 of FIG. 1E extends through cable 304 OR circuit 174 of FIG. 1D to lead 124 which extends to FIG. 1A and where the pulse thereon is used to set the validity bit which is in register 306 to its "1" state.

The MP1-4 pulse from pulse generator 117 of FIG. 1E extends through cable 304 OR circuit 200 of FIG. 1C to lead 160 which extends to FIG. 1B and where the pulse thereon is used to interrogate the associative memory for a match.

The MP1-5 pulse from pulse generator 117 of FIG. 1E extends through cable 304 to FIG. 1C where the pulse thereon is applied to gate 324 in order to test the flip-flop 316. If flip-flop 316 is in its "1" state, a pulse will appear on lead 208. If flip-flop 316 is in its "0" state a pulse will appear on lead 210. Lead 210 extends to FIG. 1E where it is used to start the pulse generator 211 which delivers the pulse MP1-6. The pulse on lead 208 extends to FIG. 1E where it is used to start the pulse generator 209 which delivers the pulses MP1-7, MP1-8, MP1-9 and MP1-10. The MP1-6 pulse from pulse generator 211 of FIG. 1E extends to FIG. 1D where it passes through OR circuit 140 to lead 170. Lead 170 extends to FIG. 1B where the pulse thereon provides the write access for the associative memory. The MP1-6 pulse also extends to FIG. 1C where it passes through OR circuit 194 to lead 144. Lead 144 extends to FIG. 1A where the pulse thereon is applied to gate 372 in order to gate the validity bit to cable 374 which extends to the validity section of the associative register of FIG. 1B. The MP1-6 pulse also extends to FIG. 1D where it passes through OR circuit 192 to lead 142. Lead 142 extends to FIG. 1A where the pulse thereon is applied to gate 350 in order to gate the reference bit to cable 352 which extends to the reference section of the associative register of FIG. 1B. The MP1-6 pulse also extends to FIG. 1C where it passes through OR circuit 148 to lead 149 which extends to FIG. 1A and where the pulse thereon is applied to gates 384, 388 and 379 in order to gate the base, displacement and address to the associative memory via cables 386, 390 and 377 respectively. The MP1-6 pulse also extends to FIG. 1C where it passes through OR circuit 198 to lead 150. Lead 150 extends to FIG. 1A where the pulse thereon is applied to gate 380 in order to gate the data to the associative memory via cable 382. The MP1-6 pulse also extends to FIG. 1C where it passes through OR circuit 200 to lead 160. Lead 160 extends to FIG. 1B where the pulse thereon is used to provide an access of the associative memory under control of the top most match.

The MP1-7 pulse from pulse generator 209 of FIG. 1E extends to FIG. 1B where it is applied to lead 152 and where it provides the "shift pointer 1" pulse.

The MP1-8 pulse from pulse generator 209 of FIG. 1E extends to FIG. 1B where it is applied to lead 158 which is the "shift pointer 2" line.

The MP1-9 pulse from pulse generator 209 of FIG. 1E extends to FIG. 1B where it is applied to lead 156 in order to reset the intermediate flip-flops. In this manner, the pointer is moved to the next position where the reference bit is equal to "0".

The MP1-10 pulse from pulse generator 209 of FIG. 1E extends to FIG. 1D where it passes through OR circuit 140 to lead 170. Lead 170 extends to FIG. 1B where a pulse thereon is used to provide the write access for the associative memory. The writing of the validity bit, reference bit, base, displacement, address and data have already been described in connection with the MP1-6 pulse. These operations are exactly the same for the MP1-10 pulse and therefore the description will not be repeated. The only thing that is different between the MP1-10 pulse and MP1-6 pulse is that the MP1-10 pulse writes the aforesaid items under the control of the pointer flip-flop which is explained as follows. The MP1-10 pulse from pulse generator 209 extends to FIG. 1B via cable 304 where the pulse is applied to lead 166 which accesses the associative memory under control of the pointer flip-flop.

The MP2 circuit operation is started by a pulse on lead 118 which comes from the general purpose computer of FIG. 1A and extends via cable 300 to FIG. 1E where it is applied on lead 118 to the pulse generator 119 of FIG. 1E. Pulse generator 119 produces the MP2-1, MP2-2, MP2-3 and MP2-4 pulses.

The MP2-1 pulse from pulse generator 119 extends through OR circuit 190 of FIG. 1D to lead 138 which extends to FIG. 1A and where the pulse thereon is applied to gate 358 in order to gate cable 112 to the address register 360. The MP2-1 pulse from pulse generator 119 of FIG. 1E also extends through OR circuit 212 of FIG. 1C to lead 214 on FIG. 1C. Lead 214 extends to FIG. 1A and the pulse thereon is applied to gate 362 in order to gate cable 114 to the data register 364.

The MP2-2 pulse from pulse generator 119 of FIG. 1E extends via cable 304 to FIG. 1A where it is applied to gate 366 in order to gate cable 368 to cable 370 which extends to FIG. 1B in order to permit the associative memory to associate on the address less the two right-hand bits.

The MP2-3 pulse from pulse generator 119 of FIG. 1E extends via cable 304 through OR circuit 200 of FIG. 1C to lead 160 which extends to FIG. 1B and where the pulse thereon is used to interrogate the associative memory for a match.

The MP2-4 pulse from FIG. 1E extends to FIG. 1C where it is applied to gate 326 in order to test EOL flip-flop 316. If flip-flop 316 is in its "1" state, a pulse will appear on lead 216. If flip-flop 316 is in its "0" state, a pulse will appear on lead 218. These two leads 216 and 218 extend from gate 236 to FIG. 1E where a pulse on lead 218 is used to start pulse generator 219 which produces the MP2-5 pulse and the pulse on lead 216 is applied to the pulse generator 217 which produces the pulses MP2-6, MP2-7, MP2-8 and MP2-9.

The MP2-5 pulse from pulse generator 219 extends via cable 304 to FIG. 1D where it passes through OR circuit 140 to lead 170. Lead 170 extends to FIG. 1B where the pulse thereon provides the write access for the associative memory. The MP2-5 pulse also extends to FIG. 1C where it passes through OR circuit 194 to lead 144. Lead 144 extends to FIG. 1A where a pulse thereon is applied to gate 372 in order to gate the validity bit which is in register 306 to cable 374. Cable 374 extends to FIG. 1B where it is effective to write the information in the associative memory.

The MP2-5 pulse also extends to FIG. 1C where it passes through OR circuit 196 to lead 164. Lead 164 extends to FIG. 1B where it is used to access the associative memory under the control of the match indicators.

The MP2-6 pulse from pulse generator 217 of FIG. 1E extends via cable 304 to FIG. 1D where it passes through OR circuit 174 to lead 124. Lead 124 extends to FIG. 1A where the pulse thereon is used to set the validity bit to its "1" state. The MP2-6 pulse also extends to FIG. 1D where it passes through OR circuit 122 to lead 162. Lead 162 extends to FIG. 1B where the pulse thereon is used to set the match indicators to their "1" state. The MP2-6 pulse also extends to FIG. 1D where it passes through OR circuit 184 to lead 202. Lead 202 extends to FIG. 1B where the pulse thereon is used to set flip-flop 316 to its "0" state.

The MP2-7 pulse from pulse generator 217 of FIG. 1E extends via cable 304 to FIG. 1A where it is applied to gate 378 in order to gate the full address which is in register 360 to cable 376.

Cable 376 extends to FIG. 1B where the information thereon is used to associate on the full address in the associative memory.

The MP2-8 pulse from pulse generator 217 of FIG. 1E extends via cable 304 to FIG. 1C where it passes through OR circuit 200 to lead 160. Lead 160 extends to FIG. 1B where the pulse thereon is used to interrogate the associative memory for a possible match. The MP2-9 pulse from pulse generator 217 extends via cable 304 to FIG. 1C where it is applied to AND circuit 322 in order to test flip-flop 316. If flip-flop 316 is in its "0" state, a pulse will appear on lead 220 which extends to FIG. 1E and is used to start the pulse generator 221 which delivers the MP2-10 pulse.

This MP2-10 pulse extends to FIG. 1D via cable 304 where it passes through OR circuit 140 to lead 170. Lead 170 extends to FIG. 1B where the pulse thereon is used to provide the write access for the associative memory. The MP2-10 pulse from pulse generator 221 of FIG. 1E also extends via cable 304 to FIG. 1C where it passes through OR circuit 198 to lead 150. Lead 150 extends to FIG. 1A where it is applied to gate 380 in order to gate the data which is in register 364 to cable 382. Cable 382 extends to FIG. 1B and provides the data which is to be written into the associative memory. The MP2-10 pulse also extends to FIG. 1C where it passes through OR circuit 194 to lead 144. Lead 144 extends to FIG. 1A where the pulse thereon is applied to gate 372 in order to gate the validity bit which is in register 306 to cable 374. Cable 374 extends to FIG. 1B where it is used to write the validity bit into the associative memory. The MP2-10 pulse from FIG. 1E also extends to FIG. 1C where it passes through OR circuit 196 to lead 164. Lead 164 extends to FIG. 1B where the pulse thereon is used to provide the access to the associative memory under the control of the match indicators.

Next to be described is the MP3 circuit operation which is initiated by the pulse on lead 120 of FIG. 1A which comes from the general purpose computer and which extends via cable 300 to FIG. 1E and is used to start pulse generator 121 which delivers the pulses MP3-1, MP3-2, MP3-3 and MP3-4.

The MP3-1 pulse from pulse generator 121 of FIG. 1E extends via cable 304 to FIG. 1D where it passes through OR circuit 176 to lead 126. Lead 126 extends to FIG. 1A where the pulse thereon is applied to gate 308 in order to gate cable 100 to the register 310.

The MP3-1 pulse also extends to FIG. 1D where it passes through OR circuit 188 to lead 136. Lead 136 extends to FIG. 1A where the pulse thereon is effective to set the validity bit in register 306 to its "0" state. The MP3-1 pulse also extends to FIG. 1D where it passes through OR circuit 122 to lead 162. Lead 162 extends to FIG. 1B where the pulse thereon is effective to set all the match indicators to their "1" state. The MP3-1 pulse also extends to FIG. 1D where it passes through OR circuit 184 to lead 202. Lead 202 extends to FIG. 1B where the pulse thereon is used to set the flip-flop 316 to its "0" state.

The MP3-2 pulse from pulse generator 121 of FIG. 1E extends via cable 304 to FIG. 1D where it passes through OR circuit 182 to lead 132. Lead 132 extends to FIG. 1A where the pulse thereon is applied to gate 324 in order to gate the contents of the base register 310 to cable 326. Cable 326 extends to FIG. 1B and provides the information necessary to associate on the base in the associative memory.

The MP3-3 pulse from pulse generator 121 of FIG. 1E extends via cable 304 to FIG. 1C where it passes through OR circuit 200 to lead 160. Lead 160 extends to FIG. 1B where the pulse thereon is used to interrogate the associative memory for a possible match.

The MP3-4 pulse from pulse generator 121 of FIG. 1E extends via cable 304 to FIG. 1C where the pulse thereon is applied to AND circuit 334 in order to test flip-flop 316. If flip-flop 316 is in its "0" state, a pulse will appear on lead 222. Lead 222 extends to FIG. 1E where the pulse thereon is effective to start pulse generator 223 which delivers the MP3-5 pulse.

The MP3-5 pulse from pulse generator 223 of FIG. 1E extends via cable 304 to FIG. 1D where it passes through OR circuit 140 to lead 170. Lead 170 extends to FIG. 1B where the pulse thereon provides the write access for the associative memory. The MP3-5 pulse also extends to FIG. 1C where it passes through OR circuit 194 to lead 144. Lead 144 extends to FIG. 1A where the pulse thereon is applied to gate 372 in order to gate the validity bit from register 306 to cable 374. Cable 374 extends to FIG. 1B where it is used to apply the validity bit to the associative memory in order to write it into the associative memory.

The MP3-5 pulse also extends to FIG. 1C where it passes through OR circuit 196 to lead 164. Lead 164 extends to FIG. 1B where the pulse thereon is used to access the associative memory under control of the match indicators.

Thus, in summary, four different circuit operations are required. The first (MP0) circuit operation is initiated by the signal on lead 104 of FIG. 1A for the MP0 access. The second (MP1) circuit operation is initiated by the signal on lead 116 of FIG. 1A and provides the MP-1 access. The third (MP2) circuit operation is initiated by the signal on lead 118 of FIG. 1A and this provides MP-2 access.

The fourth (MP3) access is initiated by a signal on lead 120 of FIG. 1A which initiates the MP-3 access of the implicit registers.

What has been described are an implicit address structure and technique for rapidly accessing storage registers by eliminating the need for generating a separate address before referencing the register. A structure is provided for generating an address composed of parameters which are incorporated into the contents of the storage register. At the same time that the address generation occurs, the structure of the present invention provides an associative compare of the implicit registers, and if there is a match, the address generation step is terminated and the data is immediately available from the implicit register.

More particularly, a structure and method has been described whereby a memory device, for example a cache, may be accessed without parameters. For example, in a machine with a base register B and a displacement D, the contents of B and D would go into forming the name of the register currently containing the name of the register currently containing the data stored in the memory location.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. In a general purpose computer system of the type including a general purpose computer having a storage cache containing data and base and displacement registers wherein said general purpose computer and said base and displacement registers generate data accessing instructions including base and displacement information for accessing data from said storage cache of said general purpose computer, a structure for accessing data from an associative memory containing a plurality of implicit registers and using said base and displacement information generated by said general purpose computer and said base and displacement registers to access said data from said associative memory comprising:

an associative memory including a plurality of associative memory implicit registers with read-in, read-out control circuits, each of said implicit registers containing data the same as data contained in said storage cache of said general purpose computer and identified by a different address word composed of a combination of a base and displacement word, means connected to said general purpose computer, said base and displacement registers and said associative memory and responsive to a data accessing instruction generated by said general purpose computer and said base and displacement registers for providing said base and displacement words obtained from said data accessing instruction and a command signal to said plurality of associative memory implicit registers, means included in said associative memory and responsive to said command signal for comparing said base and displacement words with said address words of each of said implicit registers and, upon occurrence of a compare in one of said implicit registers, producing a "data valid" signal, means for transferring said "data valid" signal and the data contained in said implicit register on which said compare occurred, back to said general purpose computer, wherein said general purpose computer further commences to generate an address for obtaining data from said storage cache of said general purpose computer at the same time said data accessing instructions are generated, and wherein said "data valid" signal is transferred to said general purpose computer with said data and functions to abort said storage cache address generation of said general purpose computer.

2. A system according to claim 1 wherein said general purpose computer further commences to generate said address for obtaining data from said storage cache of said general purpose computer at the same time said data accessing instructions are generated, and wherein, in the absence of a compare in any of said implicit registers, no "data valid" signal is transferred to said general purpose computer and said general purpose computer storage cache address generation continues to produce an address.

3. A system according to claim 1 wherein said general purpose computer includes means for changing the data stored in said storage cache of said general purpose computer, and further including means connected to said general purpose computer and said associative memory for producing a corresponding change in the data stored in the associative memory implicit register related to the data being changed in said storage cache of said general purpose computer.

4. A system according to claim 3 further including a first means connected to said general purpose computer and said associative memory for transferring a signal to said associative memory when said general purpose computer data accessing instructions include a "store" command and a second means for transferring a signal to said associative memory when said general purpose computer data accessing instructions include a "non-store" command, said "non-store" command, functioning to enter said address data produced by said general purpose computer into said associative memory when said associative memory does not contain said address data, and said "store" command functioning to invalidate address data in said associate memory and replace it with said address data generated by said general purpose computer when said general purpose computer changes said data stored in said storage cache of said general purpose computer.

5. In a computer system of the type including a general purpose computer and a base register containing base information B, a displacement register containing displacement information D, a storage cache in said general purpose computer containing data and an associative memory means including a plurality of implicit registers containing data, a method of accessing data in response to an instruction from said general purpose computer including the step of forming first address from said general purpose computer instruction consisting of said base information B and said displacement information D and applying said first address to each of said plurality of implicit registers of said associative memory for comparing said address with the contents of said implicit registers, the step of generating a second address for accessing data from said storage cache of said general purpose computer at the same time said base information B and displacement information D instruction is generated, the step of producing a "data valid" signal upon occurrence of a compare between said base B and displacement D first address and the contents of one of said implicit registers, the step of transferring said "data valid" signal and the data contained in said one implicit register to said general purpose computer for aborting said general purpose computer storage cache data accessing second address generation step.

* * * * *

UNITED STATES PATENT AND TRADEMARK OFFICE
CERTIFICATE OF CORRECTION

PATENT NO. : 4,280,177
DATED : July 21, 1981
INVENTOR(S) : Herbert Schorr et al.

It is certified that error appears in the above-identified patent and that said Letters Patent is hereby corrected as shown below:

Column 2, line 26, delete "slowly" and insert -- slowing --.

Signed and Sealed this

Thirteenth Day of July 1982

[SEAL]

Attest:

GERALD J. MOSSINGHOFF

Attesting Officer          Commissioner of Patents and Trademarks